US010073017B2

(12) United States Patent
Holland et al.

(10) Patent No.: US 10,073,017 B2
(45) Date of Patent: Sep. 11, 2018

(54) TISSUE SPECIMEN HANDLING DEVICE

(71) Applicants: Wayne Thomas Holland, Wesley Chapel, FL (US); Rexford Charles Johnson, Lake Oswego, OR (US)

(72) Inventors: Wayne Thomas Holland, Wesley Chapel, FL (US); Rexford Charles Johnson, Lake Oswego, OR (US)

(73) Assignee: PATH TECH, LLC, Tualatin, OR (US)

( * ) Notice: Subject to any disclaimer, the term of this patent is extended or adjusted under 35 U.S.C. 154(b) by 0 days.

(21) Appl. No.: 14/941,637

(22) Filed: Nov. 15, 2015

(65) Prior Publication Data

US 2016/0153877 A1 Jun. 2, 2016

Related U.S. Application Data

(60) Provisional application No. 62/230,402, filed on Jun. 4, 2015, provisional application No. 61/965,322, filed on Jan. 27, 2014.

(51) Int. Cl.

| | |
|---|---|
| ***G01N 1/10*** | (2006.01) |
| ***G01N 1/31*** | (2006.01) |
| ***B65H 16/02*** | (2006.01) |
| ***B65H 18/28*** | (2006.01) |
| ***G09F 23/10*** | (2006.01) |
| ***D21H 27/00*** | (2006.01) |
| ***D21H 21/36*** | (2006.01) |
| ***B65H 75/18*** | (2006.01) |

(52) U.S. Cl.
CPC ............. *G01N 1/31* (2013.01); *B65H 16/021* (2013.01); *B65H 18/28* (2013.01); *B65H 75/187* (2013.01); *D21H 21/36* (2013.01); *D21H 27/002* (2013.01); *G09F 23/10* (2013.01); *G01N 2001/315* (2013.01); *Y10T 428/15* (2015.01)

(58) Field of Classification Search
CPC ........................................................ G01N 1/36
See application file for complete search history.

(56) References Cited

U.S. PATENT DOCUMENTS 5,424,040 A * 6/1995 Bjornsson .......... A61B 10/0096 422/536
5,427,742 A * 6/1995 Holland .................. G01N 1/36 422/536
8,383,067 B2 * 2/2013 Williamson, IV .......................... A61B 10/0096 422/536

* cited by examiner

*Primary Examiner* — Jyoti Nagpaul
(74) *Attorney, Agent, or Firm* — Weiss & Weiss; Philip M. Weiss

(57) ABSTRACT

A tissue specimen handling device comprising a tissue processing cassette.

19 Claims, 5 Drawing Sheets

Fig. 6
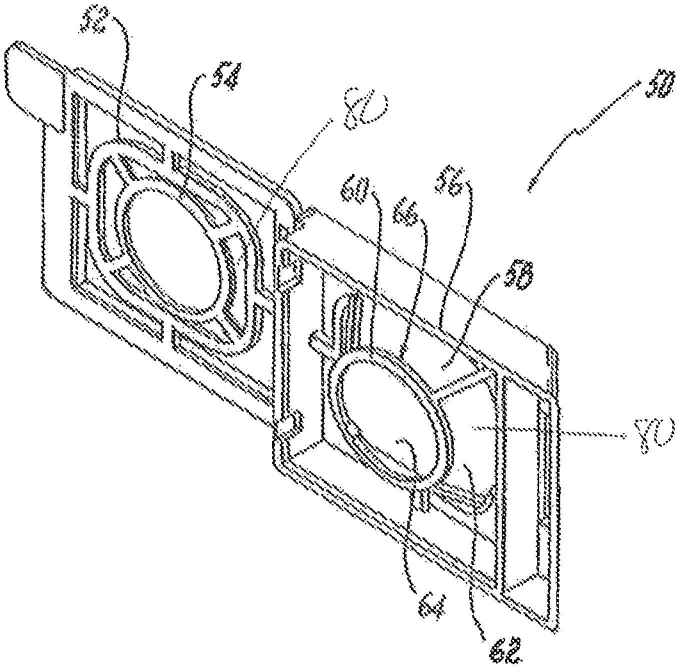
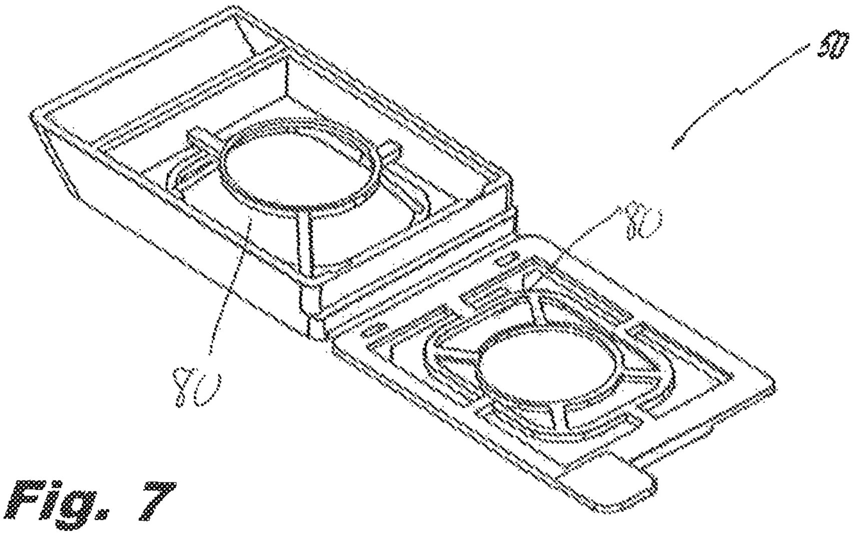
Fig. 7

TISSUE SPECIMEN HANDLING DEVICE

RELATED APPLICATIONS

This application is based on provisional application Ser. No. 62/230,402 filed Jun. 4, 2015.

FIELD OF THE INVENTION

The present invention relates to a tissue specimen handling device.

BACKGROUND OF THE INVENTION

US patent publication 2009/0015826 relates to an optical assay system for intraoperative assessment of tumor margins. The invention includes a biological sample containment and illumination apparatus for holding a biological sample for illumination by a plurality of electromagnetic radiation probes. The biological sample containment and illumination apparatus includes a plurality of frame members positioned with respect to each other to form an interior space for receiving a biological sample. At least one of the plurality of frame members includes a plurality of probe receiving locations for receiving a plurality of electromagnetic radiation probes.

US patent publication 2004/0175820 relates to a technique of cultivating thin pieces of bio-tissue for a long period of time while maintaining the freshness. Thin slices of tissue are obtained and loaded on a loading table. The pieces of bio-tissue are taken from the slicer and put on a film frame having pasted thereon a film that is inserted into the slits.

U.S. Pat. No. 8,597,936 relates to an automatically operating table-top apparatus for reproducible production of cell or tissue samples to be examined and arranged on specimen slides. Receiving devices provided in the peripheral region of the device are disposed to receive specimen slides on which automatically segmented cell and tissue segments can be positioned in a reproducible and aligned manner. The cell and tissue segments are fixed in position on the slides with adhesive, and the slides are subjected to further treatment processes in a further treatment device.

U.S. Pat. No. 5,968,436 relates to a method of fixedly supporting a biopsy specimen in an embedding cassette comprising putting the specimen in the cassette, pouring a supporting agent into the space surrounding the specimen to embed the specimen and gelling the supporting agent in this state by immersing the same in a solution of a mannan gelating agent. The embedding cassette comprises a lid and a container. The central portion of a flat frame is caused to protrude toward one side thereof to form a flat container. Either the lid or bottom of the container is formed of a transparent porous plate. A protruding edge is formed along the circumference of the opening of the container, the edge protrudes toward the other side of the flat frame, and through holes communicating with both sides are formed in the flat frame in the periphery of the container.

U.S. Pat. No. 7,618,812 relates to a device for providing a hybridization chamber for hybridizing nucleic acid samples, proteins or tissue sections on a slide, and is a rectangular body movable opposite a slide. The device includes a surface, lines for supplying or removing media, a specimen supply line and an agitating device.

U.S. Pat. No. 7,459,306 relates to a device for providing a gap-shaped hybridization space to hybridize nucleic acid samples, proteins or tissue sections over a slide. The device moves in relation to the slide and comprises an annular sealing surface to seal the hybridization space by an application to a surface of the slide. The device comprises a specimen supply line and an agitation device. Air bubbles present in the hybridization space are blocked by relief structures.

U.S. Pat. No. 6,946,287 relates to a device for providing a hybridization chamber for hybridizing nucleic acid samples, proteins or tissue sections on a slide, implemented so it is movable in relation to the slide, and includes annular sealing surface for sealing hybridization chamber by being applied to a surface of slide, lines for supplying and removing media to and from hybridization chamber and a specimen supply line. Process units are disclosed.

U.S. Pat. No. 5,080,869 relates to a stackable cassette and apparatus for preparation of multiple tissue specimens for histological examination. The cassettes include a bottom wall, two side walls, a front wall and a back wall which define a cavity. The bottom wall has a plurality of apertures for passage of fluid through the cassette in a direction orthogonal to the plane of the bottom wall. At least two of the walls have a plurality of apertures for passage of fluid through the cassette in the direction parallel to the plane of the bottom wall. The cassette can include a web of porous material disposed over the apertures in the bottom and side walls.

U.S. Pat. No. 6,448,063 relates to an apparatus for performing observations of a sliced specimen of a biological tissue is disclosed. The apparatus includes a vessel for holding saline solution, a specimen holder with a membrane filter at the bottom, a solution introduction tube for feeding saline solution into the vessel, and a solution discharge tube for sucking saline solution out of the vessel.

U.S. Pat. No. 8,741,232 relates to a specimen holding a positioning apparatus to substantially non-movably maintain a specimen, tissue, in a fixed or stable orientation with respect to imaging operations, transport, for use in facilitating accurate detection and diagnosis of cancers or other abnormalities of the specimen.

U.S. Pat. No. 8,449,477 relates to a device for tissue handling, while maintaining the in-vivo tissue orientation. The device includes a structure for receiving and holding a tissue specimen, wherein the tissue specimen includes tissue positional references; device positional references associated with the structure for fixing orientation of the tissue specimen, when held by the device, to reflect the tissue specimen positional references.

U.S. Pat. No. 5,427,742 relates to a tissue processing cassette for processing small tissue specimen that includes a base frame and a lid frame, each including a central opening and a face adapted to abut the face of the other in registered relation in a closed position. A porous screen spans the central opening of each of the base frame and the lid frame, the screens being spaced apart when the cassette is closed, whereby the base frame, the lid frame and the screens define an enclosed area for holding a tissue specimen during preparation for examination. The porous screen permits processing fluids to flow through the enclosure, but resists entry of particulate contaminants into the enclosure, and resists outflow of small tissue specimens from enclosure. The enclosure has interior perimeter surface that includes no sharp corners that can trap a small specimen. An outer base frame fits standard tissue specimen molds and has a larger area than the central opening, includes a web that is rigid and porous for supporting the base frame. The lid frame can also be supported by a web extending inwardly from a larger outer lid frame. The cassette also includes a mechanism for releasably maintaining the cassette in the closed position. The porous screen is preferably fabricated from a woven nylon material.

SUMMARY OF THE INVENTION

The present invention relates to a tissue processing cassette for processing small tissue specimens. The processing cassette includes a base frame and a lid frame, each including a central opening and a face adapted to abut the face of the other in registered relationship in a closed position. A porous screen spans the central opening of each of the base frame and the lid frame. The screens are spaced apart when the cassette is closed, whereby the base frame, the lid frame, and the screens define an enclosed area for holding a tissue specimen during preparation for histological examination. The porous screen permits processing fluids to flow through the enclosure, but resists entry of particulate contaminants into the enclosure, and also resists outflow of small tissue specimens from the enclosure during processing.

The device of the present invention comprises three dimensional angles provided by funnel shape design for the base screen. It is an object of the present invention for the design to be an inverted pyramid funnel shape design.

It is an object of the present invention for the design of the present invention to reduce surface tension thus promoting increased fluid exchange within the enclosed area that holds the tissue.

It is an object of the present invention for the funnel shape design to facilitate the filtration of biopsies from fixation fluids to capture the biopsy and allow the fluids to flow unrestricted through the screen.

It is an object of the present invention for the enclosure to have an interior perimeter surface that includes no sharp corners that can trap a small specimen.

It is an object of the present invention for the outer base frame to be preferably rectangular in shape to fit standard tissue specimen molds and microtomes, and having a substantially larger area than the central opening for supporting the base frame.

It is an object of the present invention for there to be spaces between the web structures. It is an object of the present invention for the spaces to minimize surface tension, thus promoting increased fluid exchange and causing the cassette to sink within a fluid rather than float.

It is an object of the present invention for the lid frame to be supported by a web extending inwardly from a larger outer inner lid frame. It is an object of the present invention for the lid frame to be rectangular shaped.

It is an object of the present invention for the cassette to include a mechanism for releasably maintaining the cassette in the closed position.

It is an object of the present invention for the porous screen to be fabricated from a woven material. It is an object of the present invention for the woven material to comprise a nylon material.

It is an object of the present invention to eliminate the need to create a capillary action to have flow through the device.

It is an object of the present invention for surface tension to be eliminated by the angled inner chamber.

It is an object of the present invention to eliminate the formation of air bubbles under the device.

It is an object of the present invention that the cassette will not float.

With the prior art design, the formalin wants to float making a user believe that the flow of reagents in the processor is not accomplished. In the prior art, the tissue gets stuck in a dry air bubble in the inner chamber and will become damaged. The present invention eliminates all of the problems of the prior art.

The present invention relates to a tissue processing cassette for processing small tissue specimens comprising a cassette comprising an inner chamber lid having a web, wherein outside the inner chamber lid there is no web. An outer base frame has an inner wall chamber that has an interior perimeter surface. The outer base frame comprises an inner chamber having within it a funnel shaped design and a web. Between the inner chamber wall and the outer base frame there is no web.

BRIEF DESCRIPTION OF THE DRAWINGS

FIG. 6 shows a top open view of an embodiment of the present invention.

FIG. 7 shows a top open view of an embodiment of the present invention.

DETAILED DESCRIPTION OF THE INVENTION

Figure 1:
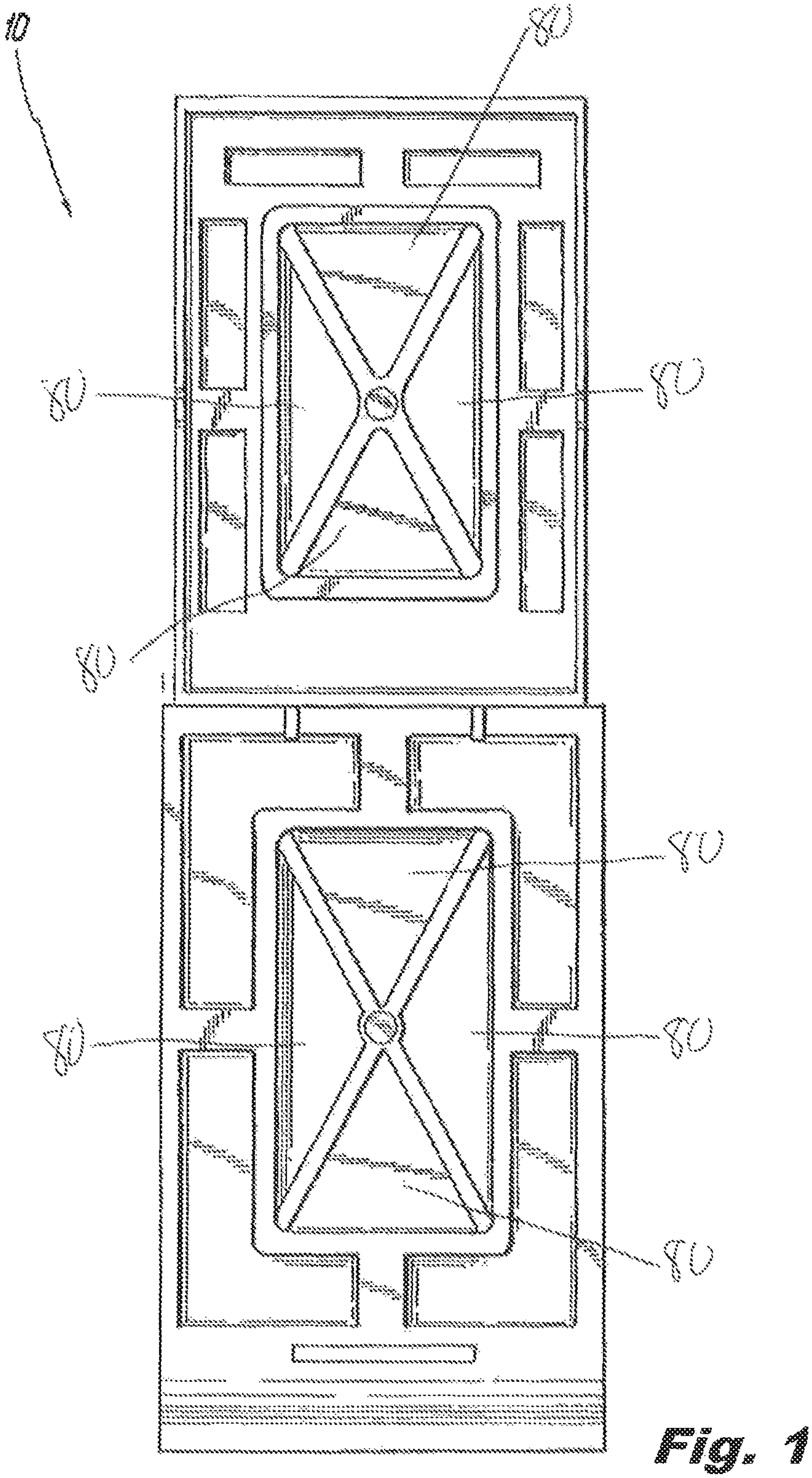
FIG. 1 shows a top view of an embodiment of the present invention.

FIG. 1 shows a top view of an embodiment of the tissue specimen handling device 10.

Figure 2:
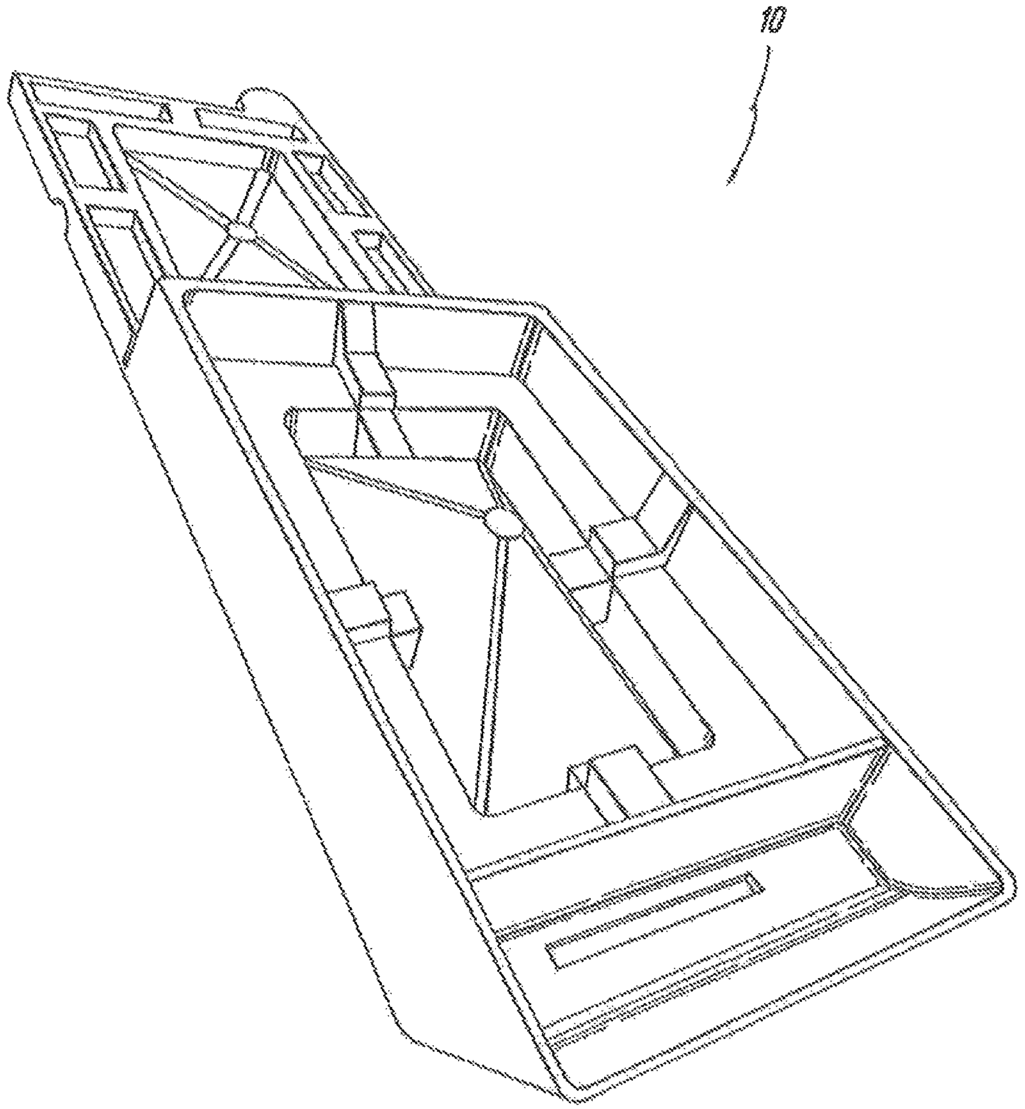
FIG. 2 shows a bottom view of an embodiment of the present invention.

FIG. 2 shows a bottom view of the tissue specimen handling device 10.

Figure 3:
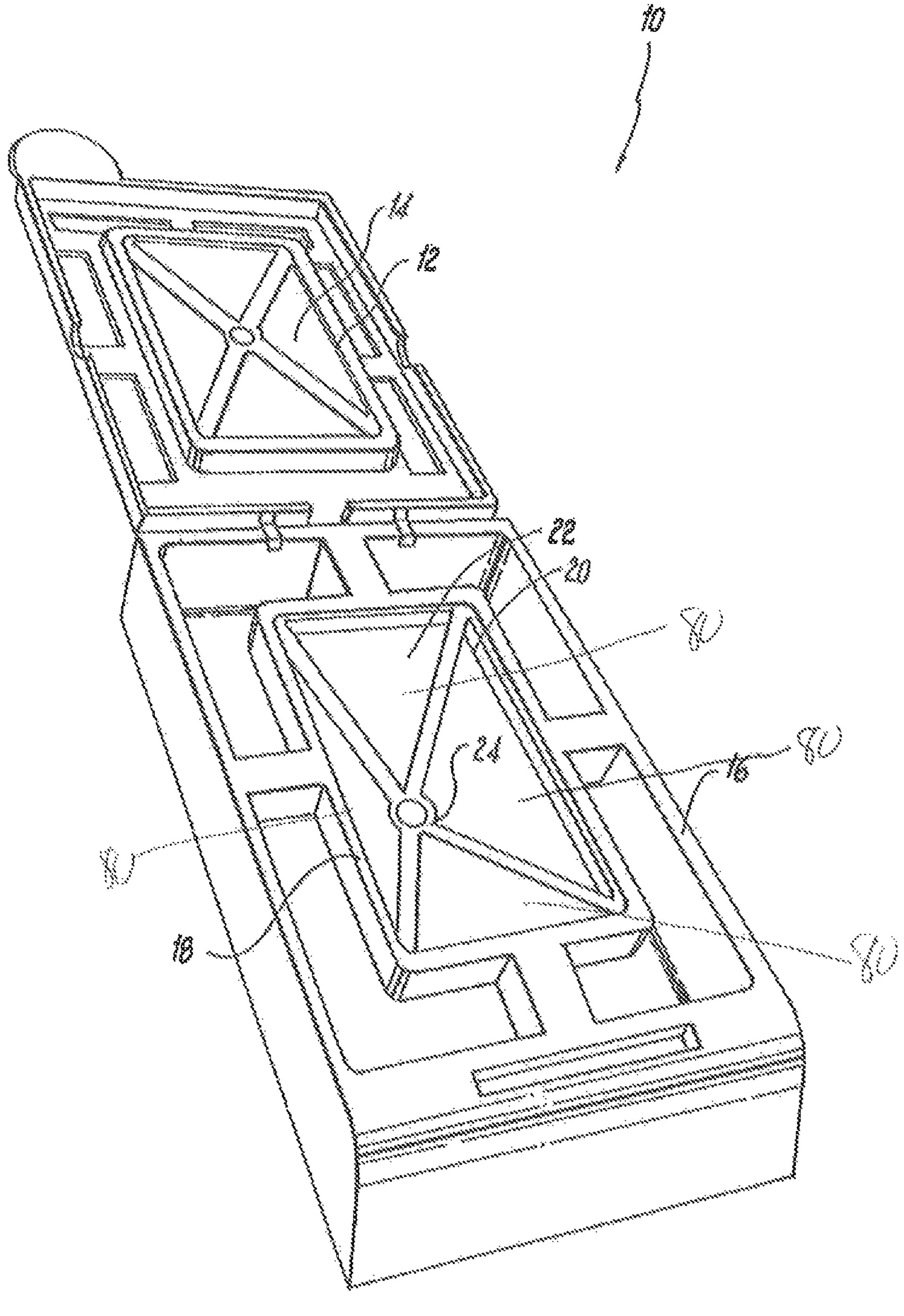
FIG. 3 shows a top view of an embodiment of the present invention.

FIG. 3 shows a bottom view of the tissue specimen handling device 10. The device 10 has an inner chamber lid 12 having a web 14. Outside the inner chamber lid 12 there is no web.

Outer base frame 16 has within it an inner wall chamber 18 having an interior perimeter surface 20. The outer base frame 16 has an inner chamber 26 having within it a funnel shaped design 24 and a web 22. Between the inner chamber wall 18 and the outer base frame 16 there is no web.

Figure 4:
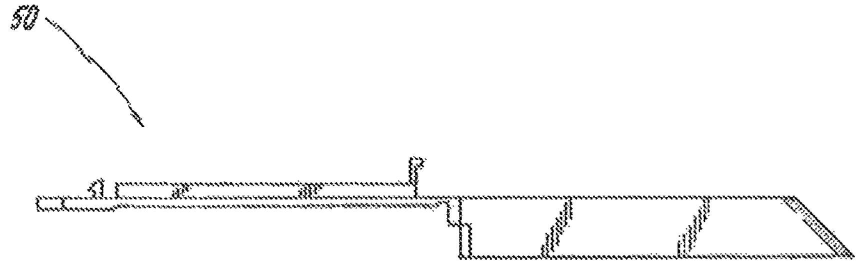
FIG. 4 shows a side view of an embodiment of the present invention.

FIG. 4 shows a side view of an embodiment of the tissue specimen handling device 50.

Figure 5:
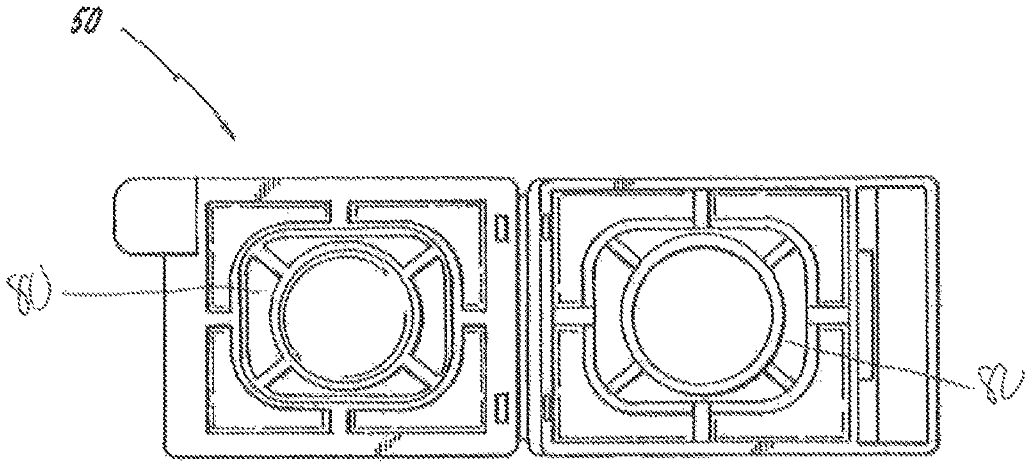
FIG. 5 shows a bottom open view of an embodiment of the present invention.

FIG. 5 shows a bottom view of an embodiment of the tissue specimen handling device 50.

FIG. 6 shows a bottom view of the tissue specimen handling device 50. The device 50 has an inner chamber lid 52 having a web 54. Outside the inner chamber lid 52 there is no web.

Outer base frame 56 has within it an inner wall chamber 58 having an interior perimeter surface 60. The outer base frame 56 has an inner chamber 66 having within it a funnel shaped design 64 and a web 62. Between the inner chamber wall 58 and the outer base frame 56 there is no web.

FIG. 7 shows a further side view of FIG. 6.

The porous screen 80 is found is FIGS. 1, 3, 5, 6, 7.

The invention claimed is:

1. A tissue processing cassette for processing small tissue specimens comprising:

a base frame;

a lid frame;

said base frame and said lid frame each including a central opening and a face;

each abutting face of said base frame and said lid frame in registered relationship in a closed position;

a porous screen spanning said central opening of said base frame and said central opening of said lid frame;

said screen spaced apart when said cassette is closed, whereby said base frame, said lid frame, and said screen define an enclosed area for holding a tissue specimen during preparation for histological examination;

a funnel shaped design on said porous screen having three dimensional angles;

wherein said funnel shaped design of said porous screen does not protrude below said base;

said funnel shaped design is an inverted pyramid.

2. The cassette of claim 1 wherein said porous screen permit processing fluids to flow through said enclosed area, but resists entry of particulate contaminants into said enclosed area, and also resists outflow of small tissue specimens from said enclosed area during processing.

3. The cassette of claim 1 wherein said cassette reduces surface tension thus promoting increased fluid exchange within said enclosed area to hold said tissue.

4. The cassette of claim 1 wherein said funnel shape design facilitates filtration of biopsies from fixation fluids to capture said biopsies and allow fluids to flow unrestricted through said screens.

5. The cassette of claim 1 wherein said enclosed area has an interior perimeter surface that includes no sharp corners that trap a small specimen.

6. The cassette of claim 1 wherein said base frame is rectangular in shape to fit standard tissue specimen molds and microtomes.

7. The cassette of claim 1 wherein said base frame has a substantially larger area than said central opening for supporting said base frame.

8. The cassette of claim 1 wherein there are spaces between said screen structures.

9. The cassette of claim 8 wherein said spaces minimize surface tension, thus promoting increased fluid exchange and causing said cassette to sink within a fluid rather than float.

10. The cassette of claim 1 wherein said lid frame is supported by a web extending inwardly from a larger outer inner lid frame.

11. The cassette of claim 1 wherein said lid frame is rectangular shaped.

12. The cassette of claim 1 wherein said cassette further comprises a mechanism for releasably maintaining the cassette in a closed position.

13. The cassette of claim 1 wherein said porous screen is fabricated from a woven material.

14. The cassette of claim 13 wherein said woven material is a nylon material.

15. The cassette of claim 1 wherein said cassette eliminates need to create a capillary action to have flow through said cassette.

16. The cassette of claim 1 further comprising an angled inner chamber that eliminates surface tension.

17. The cassette of claim 1 wherein said cassette eliminates formation of air bubbles under said cassette.

18. The cassette of claim 1 wherein said cassette will not float.

19. A tissue processing cassette for processing small tissue specimens comprising a cassette comprising an inner chamber lid having a web;

outside said inner chamber lid there is no web;

an outer base frame having an inner wall chamber that has an interior perimeter surface;

said outer base frame comprising an inner chamber having within it a funnel shaped design and a web;

wherein said funnel shaped design of said porous screen does not protrude below said base;

said funnel shaped design is an inverted pyramid;

between said inner chamber wall and the outer base frame there is no web.

* * * * *